United States Patent Office 2,784,093
Patented Mar. 5, 1957

2,784,093
METHOD OF ADDING FAT TO FEED

Samuel Feld, Brooklyn, N. Y.

No Drawing. Application November 12, 1954,
Serial No. 468,543

3 Claims. (Cl. 99—7)

This invention relates to animal and live stock feed and more particularly to an additive thereto.

It is the principal object of this invention to provide an additive of high fat content for use in compounding such feed which improves the nutritional qualities and palatability of the feed and is of such physical form as to enable a uniform and convenient incorporation of the additive into the feed.

The invention is realized by employing ordinary bread crumbs as a carrier for an edible fatty substance in the following manner:

The bread crumbs are formed from bakers' left overs or returns which are then cut or ground into small pieces or crumbs of an approximate size capable of passing through a 3/8" screen. However, the size of the crumbs is not at all critical as will be hereinafter understood. The crumbs are then toasted as in a rotary toaster which device is well known in the art.

The toasted bread crumbs, while at a temperature of approximately 150°, are combined or impregnated with rendered hot, melted animal fat or tallow being approximately 200°. The tallow is applied to the bread crumbs preferably by spraying the same on the hot crumbs although it may be poured or sprinkled thereover. As an example, 300 pounds of hot, melted tallow may be applied over 2,000 pounds of hot, toasted bread crumbs which absorb the tallow. The sprayer is itself a conventional device for spraying a hot liquid while maintaining it heated so as not to clog the sprayer and permit a free flow of the liquid.

Incorporated in the tallow is an antioxidant or stabilizer for inhibiting rancidity. As an example of such antioxidant, it may take the form of a fat soluble liquid composed of butylated hydroxyanisole, propyl gallate and citric acid, used in the proportion of one pound of the fat soluble antioxidant to 2,000 pounds of hot fat. A particular example of a fat soluble antioxidant mentioned is commercially known as Tenox II, made by the Eastman Chemical Products Company of Kingsport, Tenn. Other antioxidants may obviously be employed.

The toasted and sprayed crumbs, while still hot, are tumbled to achieve a better impregnation and a more uniform distribution of the tallow, such tumbling simultaneously cooling the product. The crispy, cellular nature of the baked and toasted bread crumbs effect a more thorough absorption of the tallow. The product is then packed in grease-proof containers.

The resulting product has been found to have a fat content of about 15 percent. It is used primarily as an additive in the manufacture of animal and stock feeds of various forms, but particularly feeds of comminuted form. Being itself comminuted and free flowing, it is conveniently milled and mixed with conventional animal and stock feeds so as to achieve certain nutritional properties as hereinafter noted.

In actual practice, it is difficult for a feed manufacturer to uniformly incorporate a measured amount of palatable fat in his product. With the use of my additive, he is enabled to easily and uniformly incorporate a specifically desired amount by simply milling or mixing it with his feed to produce a particular desired fat content in the finished product. This is made possible by the edible and cellular nature of the free flowing toasted, baked bread crumbs which permit a proper absorption of fat and an accurate and facilitated uniform incorporation of the additive into the feed manufacturer's end product by being dispersed throughout the product.

The additive is of particular merit in adding palatability, higher energy content, feed efficiency, and vitamin preservation qualities into the final feed product. Its fatty nature further helps to control undesirable dustiness in the final product.

The invention has been described in connection with a preferred form thereof, but it is obvious that changes may be made without departing from the spirit of the invention or the scope of the appended claims.

What is claimed is:

1. A method of adding fat substance to comminuted animal and stock feed which comprises the steps of impregnating baked, toasted bread crumbs with melted edible fat, cooling the resulting fatty product so that the product assumes a free flowing, comminuted form and thereafter mixing the fatty product with the comminuted feed.

2. A method of adding fat substance to comminuted animal and stock feed which comprises toasting baked bread crumbs, impregnating said bread crumbs while hot, with hot, rendered melted tallow, cooling the resulting fatty product so that the product assumes a free flowing, comminuted form and thereafter mixing the product with the comminuted feed.

3. A method of compounding a comminuted additive for animal and stock feed which comprises toasting bread crumbs, spraying the crumbs while hot with hot, melted tallow and thereafter tumbling said sprayed crumbs to produce uniformity of tallow distribution in the mixture while cooling the same.

References Cited in the file of this patent
UNITED STATES PATENTS 1,013,696     Strong _____ Jan. 2, 1912

OTHER REFERENCES

Morrison: Feeds and Feeding, 1951, Morrison Publishing Co., Ithica, New York, page 628.

Circular No. 7, American Meat Institute Foundation, April 1953, page 9.